United States Patent [19]

Paniccia, Jr.

[11] Patent Number: 5,625,674

[45] Date of Patent: Apr. 29, 1997

[54] USE OF A VCXO IN THE BASE UNIT OF A TWO-HANDSET CORDLESS TELEPHONE SYSTEM

[75] Inventor: Samuel R. Paniccia, Jr., Liverpool, N.Y.

[73] Assignee: Thomson Consumer Electronics, Inc., Indianapolis, Ind.

[21] Appl. No.: 681,132

[22] Filed: Jul. 22, 1996

Related U.S. Application Data

[63] Continuation of Ser. No. 514,338, Aug. 11, 1995, abandoned, which is a continuation of Ser. No. 397,680, Jan. 4, 1995, abandoned, which is a continuation of Ser. No. 817,933, Jan. 8, 1992, abandoned.

[51] Int. Cl.$^6$ .................................. H04M 11/00
[52] U.S. Cl. .................. 379/61; 379/58; 455/315; 455/114
[58] Field of Search .................. 379/58, 61, 63; 455/54.1, 103, 114, 315

[56] References Cited

U.S. PATENT DOCUMENTS

| | | | |
|---|---|---|---|
| 4,476,575 | 10/1984 | Franke et al. | |
| 4,741,019 | 4/1988 | Takahashi | 379/61 |
| 4,759,078 | 7/1988 | Schiller | 455/49 |
| 4,875,231 | 10/1989 | Hara et al. | 379/61 |
| 4,891,637 | 1/1990 | Siwiak et al. | 340/825.44 |
| 4,932,072 | 6/1990 | Toko | 455/76 |
| 4,935,927 | 6/1990 | Kaewell, Jr. et al. | 370/105.1 |
| 5,133,002 | 7/1992 | Kikuchi et al. | 379/58 |
| 5,239,686 | 8/1993 | Downey | 455/78 |

FOREIGN PATENT DOCUMENTS

| | | | |
|---|---|---|---|
| 0203819 | 12/1986 | European Pat. Off. | |
| 0304998 | 3/1989 | European Pat. Off. | |
| 1022275 | 1/1958 | Germany | |
| 2615769 | 10/1977 | Germany | G08B 1/08 |
| 3738666 | 5/1988 | Germany | |
| 54-11606 | 1/1979 | Japan | H04B 7/26 |
| 62-243432 | 10/1987 | Japan | H04B 1/50 |
| 2-291732 | 12/1990 | Japan | |
| 4-7923 | 1/1992 | Japan | |
| 534985 | 4/1973 | Switzerland | |
| 1527454 | 10/1978 | United Kingdom | H04B 7/00 |

*Primary Examiner*—Dwayne Bost
*Assistant Examiner*—G. J. Oehling
*Attorney, Agent, or Firm*—Joseph S. Tripoli; Peter M. Emanuel; Thomas F. Lenihan

[57] ABSTRACT

A cordless telephone system includes a single base unit and at least two remote handunits, where the base unit employs two transmitter channels coupled together through a low impedance and coupled to a single antenna. The transmitter channels include voltage controlled crystal oscillators (VCXOs) and frequency tripler circuitry, rather than PLLs in order to keep intermodulation distortion at the outputs of the transmitter amplifiers to a minimum.

2 Claims, 3 Drawing Sheets

TX SPECTRUM 5,625,674

USE OF A VCXO IN THE BASE UNIT OF A TWO-HANDSET CORDLESS TELEPHONE SYSTEM

This is a continuation of application Ser. No. 08/514,338, filed Aug. 11, 1995, now abandoned which is a continuation of application Ser. No. 08/397,680, filed Jan. 4, 1995, now abandoned which is a continuation of application Ser. No. 07/817,933, filed Jan. 8, 1992, now abandoned.

FIELD OF THE INVENTION

This invention concerns the field of cordless telephone instruments.

CROSS REFERENCE TO RELATED APPLICATION

This application is related to applications bearing U.S. patent application Ser. Nos. 817,934, and 817,932 filed herewith.

BACKGROUND OF THE INVENTION

Cordless telephone instruments for use in the home are widely available. Such systems, comprise a base unit and a remote handunit. The base unit is coupled to the telephone line and communicates with the remote handunit via FM radio signals. With such a cordless telephone system a user can remove the handunit from its cradle and carry it with him a short distance from his house yet still be able to make and receive telephone calls. Such a cordless telephone set is known from GE cordless telephone model number 2-9675 manufactured by Thomson Consumer Electronics, Inc. Indianapolis, Ind.

If the user is engaged in a conversation via a cordless telephone, and a third person within the user's house wishes to join in the telephone conversation, that person can simply pick up a "hard-wired" extension telephone. Unfortunately, the third person cannot maintain participation in the conversation without remaining in the immediate area of the hard-wired telephone unit.

A copending patent application bearing attorney docket number RCA 86,682 discloses a cordless telephone system which comprises a base unit and two handunits. In that system, a base unit transmits simultaneously to both handunits via two transmitter channels coupled to the same antenna, but during development of that system it was discovered that phase-locked loop (PLL) up-conversion used in the above-mentioned GE cordless telephone model number 2-9675 caused unacceptable intermodulation distortion in the transmitter signal from the base unit when the outputs of the transmitters were coupled together.

SUMMARY OF THE INVENTION

It is herein recognized that in a cordless telephone system including a single base unit and at least two remote handunits, wherein the base unit employs two transmitter channels coupled to a single antenna, that the transmitter channels should include voltage controlled crystal oscillators (VCXOs) and frequency tripler circuitry, rather than PLLs in order to keep intermodulation distortion at the outputs of the transmitter amplifiers to a minimum.

DETAILED DESCRIPTION OF THE DRAWING

Figure 1:
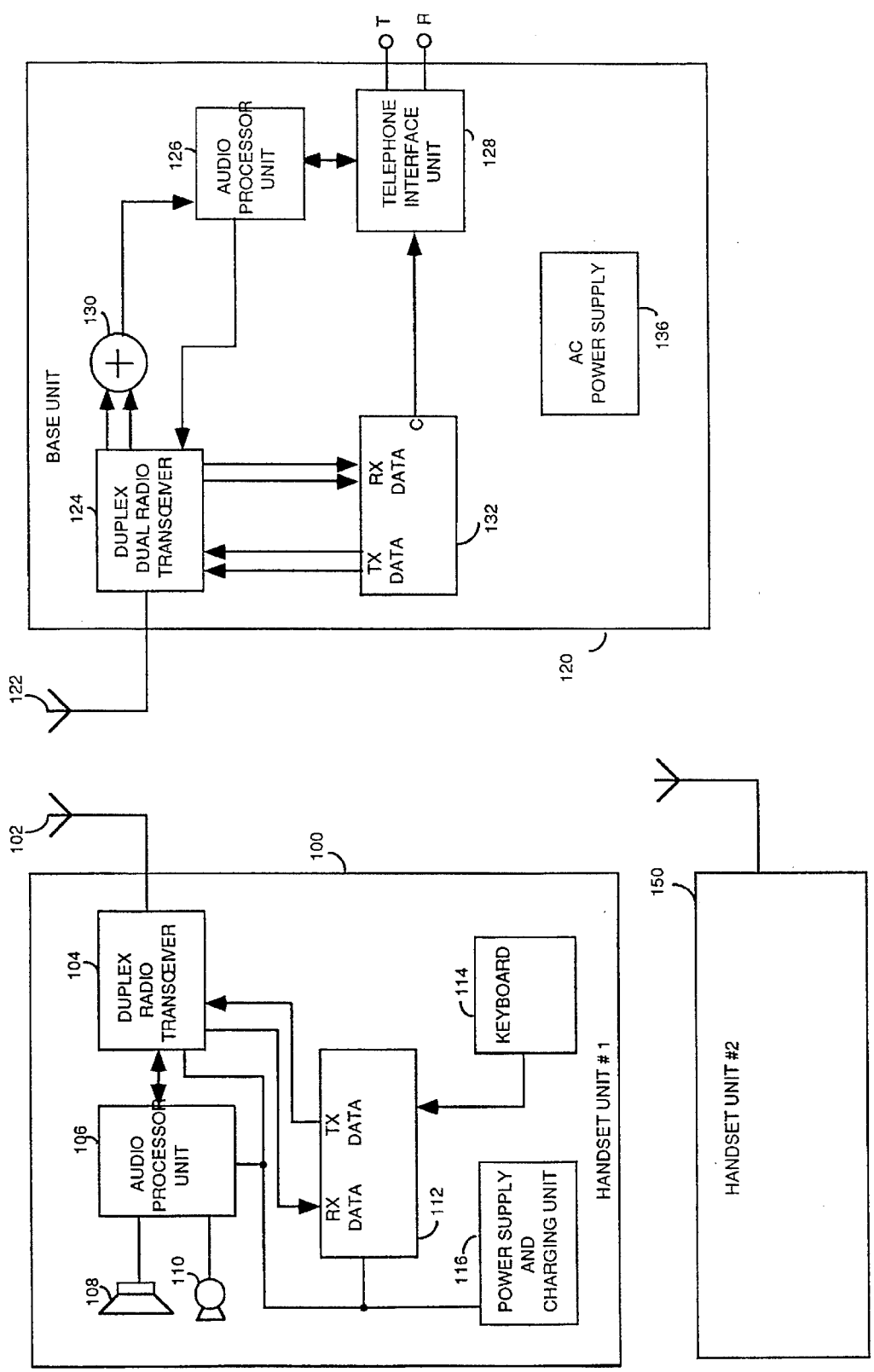
FIG. 1 is a block diagram of a cordless telephone system according to the subject invention.

FIG. 1 is a simplified illustration of a cordless telephone set comprising a first handset unit 100, a second handset unit 150, and a base unit 120. Because handset units 100 and 150 are identical (except for frequency allocation), only handset 100 will be described. Handset unit 100 receives and transmits RF signals via an antenna 102. Antenna 102 is coupled to a duplex radio transceiver unit 104 which is capable of operation in a receiver mode and in a transmitter mode. In the receiver mode, transceiver unit 104 applies received and demodulated audio signals to an audio processor unit 106 for amplification and ultimate reproduction in speaker 108. Also in the receiver mode, transceiver 104 also provides digital data to the "receive data" (i.e., Rxdata) terminal of controller 112. In the transmitter mode, transceiver 104 receives audio signals, picked-up (i.e., detected) by microphone 110 and amplified by audio processor unit 106, for transmission to base unit 120. Also in transmitter mode, transceiver 104 receives "transmit data" (i.e., Txdata) from controller 112, for transmission to base unit 120. Controller 112 is coupled to a keyboard 114 for receiving keystroke commands from a user. Handunit 100 also includes a power supply and charging unit 116 for supplying operating power to the circuitry of the handunit.

Base unit 120 receives and transmits RF signals via an antenna 122 to remote handunits 100 and 150. Antenna 122 is coupled to a duplex dual radio transceiver unit 124 which is capable of operation in a receiver mode and in a transmitter mode. In the receiver mode, transceiver unit 124 receives RF signals at two different frequencies from remote handunits 100 and 150 respectively, and applies received and demodulated audio signals to an audio processor unit 126 for amplification and coupling to the telephone system via a telephone interface unit 128. Telephone interface unit 128 is connected to the telephone system via two terminals traditionally known as tip (T) and ring (R). Also in the receiver mode, transceiver 124 also provides digital data to the "receive data" (i.e., Rxdata) terminal of controller 132. Controller 132 has a control terminal C by which telephone interface unit 128 can be controlled to establish communication over the telephone system. In the transmitter mode, transceiver 124 receives audio signals, conveyed by the telephone system via telephone interface unit 128 and amplified by audio processor unit 126, for transmission to handunits 100 and 150. Also in transmitter mode, transceiver 124 receives "transmit data" (i.e., Txdata) from controller 132, for transmission to handunit 100. Base unit 120 also includes an AC power supply unit 136 for supplying operating power to the circuitry of the base unit.

Figure 2:
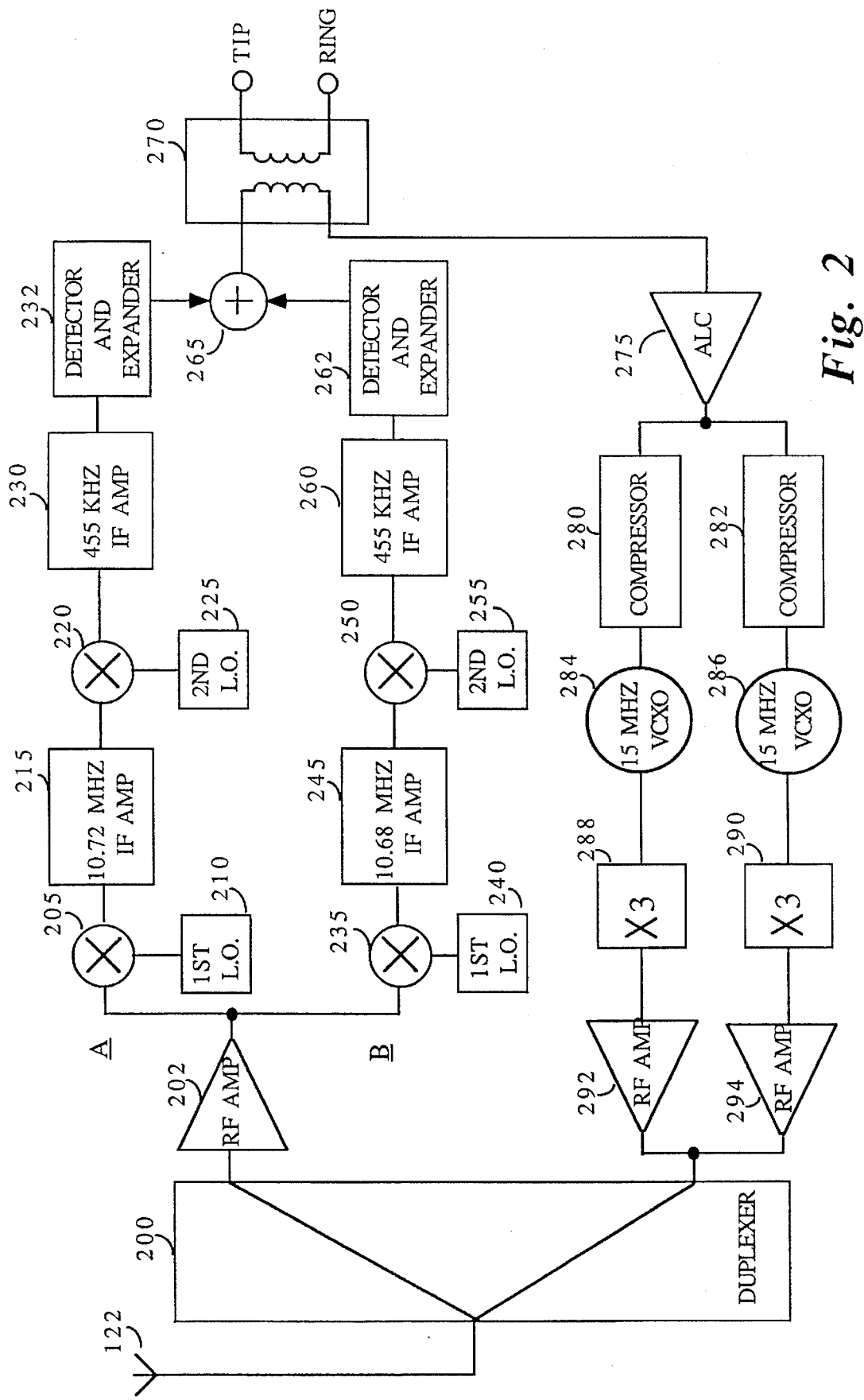
FIG. 2 is a more detailed block diagram of the base unit of FIG. 1.

FIG. 2 is a more detailed block diagram of duplex dual radio transceiver 124 of FIG. 1. Antenna 122 is coupled to an RF amplifier 202 via a duplexer 200, which may be a type DPX 46/49-B10 duplexer manufactured by Soshin Electric Ltd. Handsets 100 and 150 transmit on different frequencies near 49 MHz. The signals received from the handunits are applied to mixers 205 and 235. Mixer 205 has a second input coupled to a local oscillator 210 for receiving an oscillator signal near 39 MHz. That is local oscillator 210 is tuned to oscillate at the difference frequency between the transmission frequency of one of the remote handunits and the first intermediate (IF) frequency of 10.72 MHz of receiver channel A. Similarly, local oscillator 240 is tuned to oscillate at the difference between the transmission frequency of the other of the two remote handunits and the first nominal IF frequency of 10.68 MHz of receiver channel B.

The respective first IF frequencies of channels A and B are offset from the nominal value of 10.7 MHz as explained in copending patent application bearing U.S. patent application Ser. No. 817,932.

The down-converted 455 kHz signal of each channel is applied to respective IF amplifiers 230 and 260. After amplification the signals are detected and expanded in detector and expander units 232 and 262 to produce baseband audio signals. The baseband audio signals are then summed in a summer unit 265 and coupled to the telephone line via a hybrid transformer unit 270.

For purposes of explanation, assume that handset A transmits the signal processed in receiver channel A and handset B transmits the signal processed in receiver channel B. An A+B sidetone signal (i.e., a portion of the received signals from both channels) is coupled from hybrid transformer unit 270 via an automatic level control unit 275 to the transmitter side of the transceiver for transmission to the handunits. In this way, the sidetone signal corresponding to signals received from handset A is coupled back to handset A, and the signal received from handset A is also transmitted to handset B for A-to-B communication. Further, the sidetone signal corresponding to signals received from handset B is coupled back to handset B and the signal received from handset B is also transmitted to handset A for B-to-A communication.

The signal frown automatic level control unit 275 is applied to the inputs of two compressor units 280 and 282. The compressed audio signals are applied to control inputs of separate oscillators 284 and 286 to modulate their respective output signals. Voltage-controlled crystal oscillators 284 and 286 oscillate at different frequencies near 15 MHz. The modulated signals are then applied to respective frequency triplers 288 and 290 to bring their final frequencies to different frequencies near 46 MHz. Frequency triplers 288 and 290 include a transistor and filter elements. Due to nonlinearities in the transistor, a third harmonic of the fundamental 15 MHz signal is formed. The filter elements are tuned to pass a narrow band of signals around the third harmonic (i.e., near 46 MHz) and block all others. The signals are then amplified in amplifiers 292 and 294, are combined, and applied via duplexer 200 to antenna 122.

Figure 3:
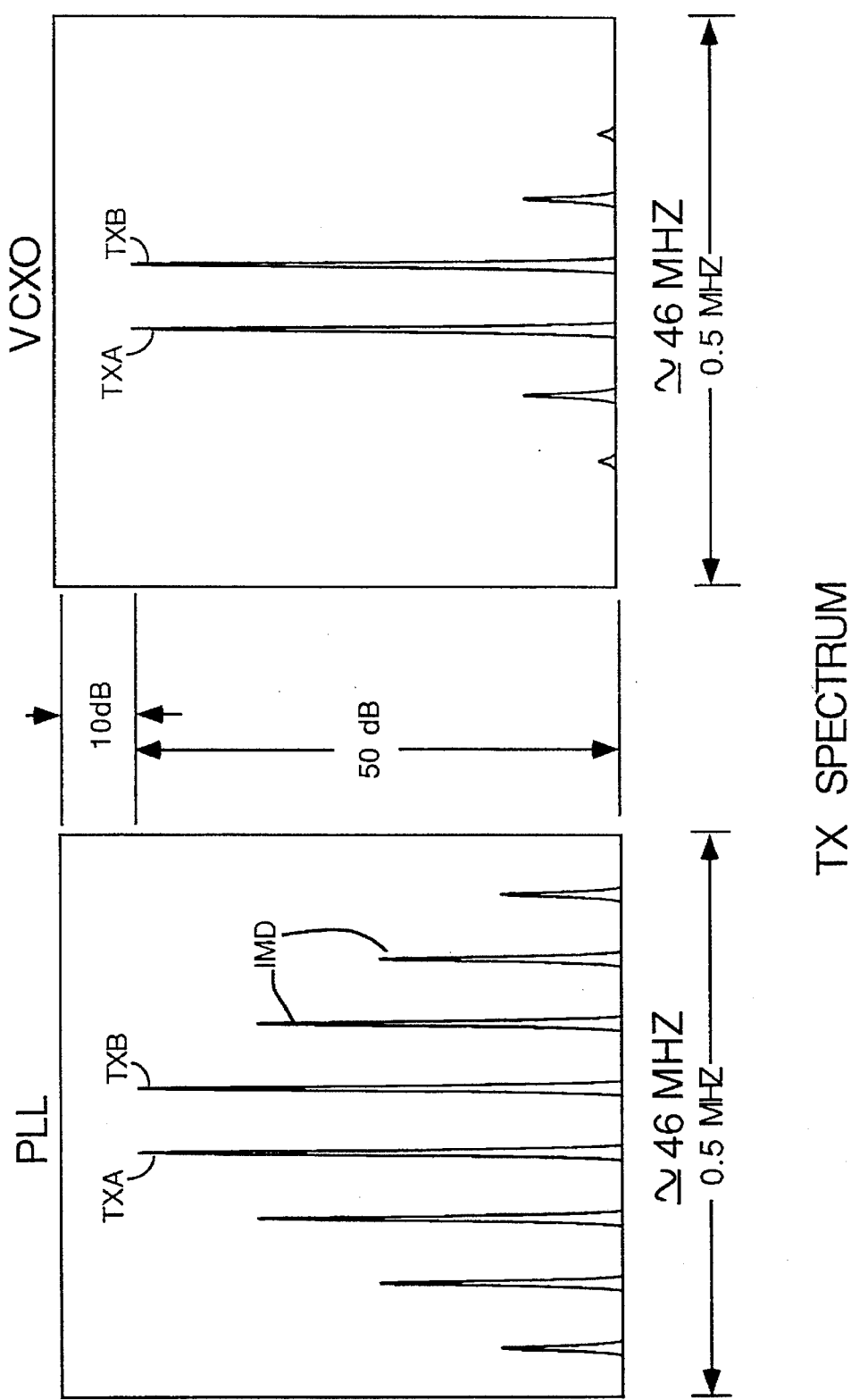
FIG. 3 shows representations of the transmitter spectrum observed for both PLL and VCXO operation.

As noted above, an early version of the subject apparatus employed a PLL up-converter unit in each transmitter channel. PLLs have been used recently because of the ease with which each of the 10 available cordless telephone channels can be synthesized. Some IMD (intermodulation distortion) was expected because of the configuration used, in which the output terminals of output RF amplifiers 292 and 294 are connected directly together. However, severe IMD was observed (see FIG. 3 for the transmitter spectrum for PLL use). Referring once again to FIG. 3, note that the IMD is sharply reduced when a VCXO and tripler arrangement is substituted for the PLL up-converter. The sharp reduction in IMD accompanying the change from PLL up-converters to VCXO circuitry clearly indicates that the source of the majority of the IMD is other than the direct connection of the output terminals of amplifiers 292 and 294, and is instead related to products generated by the PLL up-conversion process. It is noted that additional isolation can be gained by using a combiner circuit to combine the outputs of RF amplifiers 292 and 294 and by use of addition shielding between the transmitter channels, albeit at additional cost.

What is claimed is:

1. A cordless telephone set, comprising:

a first handunit for producing a first audio signal;

a second handunit for producing a second audio signal; and a base unit for simultaneously receiving signals of said handunits, and coupling said signals of said handunits to a telephone system;

said base unit including means for combining said received signals of said handunits to form a single output signal for transmission via said telephone system;

said handunits and said base unit communicating via a single antenna mounted on said base unit;

said first handunit transmitting said first audio signal on a first frequency and receiving on a second frequency;

said second handunit transmitting said second audio signal on a third frequency and receiving on a fourth frequency;

said first and third frequencies being near a nominal handunit transmitting frequency, said second and fourth frequencies being near a nominal handunit receiving frequency; and said base unit including a duplexing unit for coupling said audio signals at said first and third frequencies from said antenna to first and second base unit receiver channels, and for coupling said audio signals at said second and fourth frequencies from first and second base unit transmitter channels to said antenna, said duplexing unit being tuned to pass signals at said nominal handunit transmitting frequency and at said nominal handunit receiving frequency, said duplexing unit having a single input for receiving signals to be transmitted, and for conveying said signals received at said input to said antenna; and said base unit including first and second transmitter channels transmitting at said second and fourth frequencies respectively, said transmitter channels having respective output terminals coupled to said single input of said duplexer unit;

each of said first and second transmitting channels including a voltage controlled crystal oscillator for producing an RF signal modulated in frequency by an audio signal, and a frequency tripler circuit for producing a higher frequency modulated RF Output signal for simultaneous transmission at said second and fourth frequencies, respectively;

each of said frequency tripler circuits having a filter circuit for selecting a third harmonic signal of said modulated RF output signal of its respective voltage controlled crystal oscillator, each of said third harmonic signals being one of said second and fourth frequencies, respectively.

2. The cordless telephone set of claim 1 wherein, said second and fourth frequencies are offset from and occur near said nominal handunit receiving frequency of 46 MHz and occur within a passband which is 0.5 MHz wide.

\* \* \* \* \*